(12) United States Patent
Kawashima

(10) Patent No.: US 10,194,048 B2
(45) Date of Patent: Jan. 29, 2019

(54) IMAGE COMMUNICATION APPARATUS, METHOD OF CONTROLLING SAME, AND STORAGE MEDIUM FOR DISPLAYING ADDRESSES FROM ADDRESS BOOK

(71) Applicant: CANON KABUSHIKI KAISHA, Tokyo (JP)

(72) Inventor: Yasuaki Kawashima, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/195,274

(22) Filed: Jun. 28, 2016

(65) Prior Publication Data

US 2017/0013161 A1   Jan. 12, 2017

(30) Foreign Application Priority Data

Jul. 7, 2015  (JP) .................................. 2015-136370

(51) Int. Cl.
H04N 1/00   (2006.01)
H04N 1/32   (2006.01)

(52) U.S. Cl.
CPC ..... *H04N 1/32122* (2013.01); *H04N 1/00244* (2013.01); *H04N 2201/0094* (2013.01)

(58) Field of Classification Search
CPC ....... H04N 2201/0094; H04N 1/00244; H04N 1/32122
See application file for complete search history.

(56) References Cited

U.S. PATENT DOCUMENTS

| 7,139,827 B1 * | 11/2006 | Iwayama | ............... G06F 3/0482 |
| | | | 709/204 |
| 2010/0023589 A1 * | 1/2010 | Kuwasaki | .......... H04N 1/00204 |
| | | | 709/206 |
| 2010/0083125 A1 * | 4/2010 | Zafar | ................ G06F 17/30867 |
| | | | 715/739 |
| 2015/0096047 A1 | 4/2015 | Kawashima | ..................... 726/27 |
| 2015/0281043 A1 | 10/2015 | Kawashima | ............ H04L 45/14 |

FOREIGN PATENT DOCUMENTS

| JP | 2003078703 A | 3/2003 |
| JP | 2005026876 A | 1/2005 |
| JP | 2007156843 A | 6/2007 |
| JP | 2008-305176 | 12/2008 |
| JP | 2012070342 A | 4/2012 |

OTHER PUBLICATIONS

Japanese Office Action issued in corresponding Japanese Application No. 2015136370 dated Nov. 22, 2018.

* cited by examiner

*Primary Examiner* — Iriana Cruz
(74) *Attorney, Agent, or Firm* — Fitzpatrick, Cella, Harper & Scinto

(57) ABSTRACT

An image communication apparatus, and a method of controlling the same, control, in a case of displaying an address book stored in a storage unit of the self-apparatus, so as to display in a display unit an administrator address book; and control, in a case of displaying an address book stored in the external apparatus, so as to make a request to an external device for all address books that the external apparatus has.

6 Claims, 13 Drawing Sheets

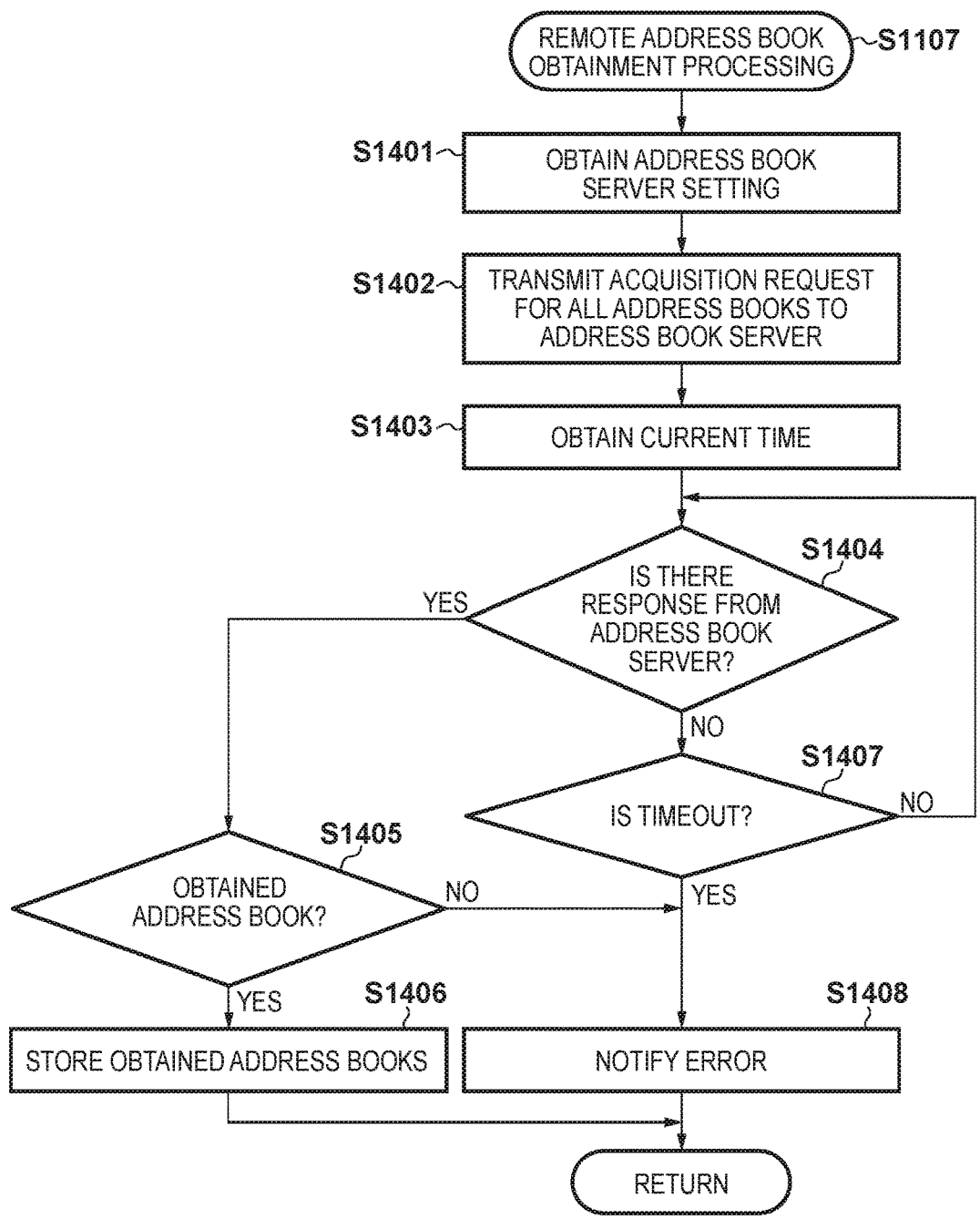

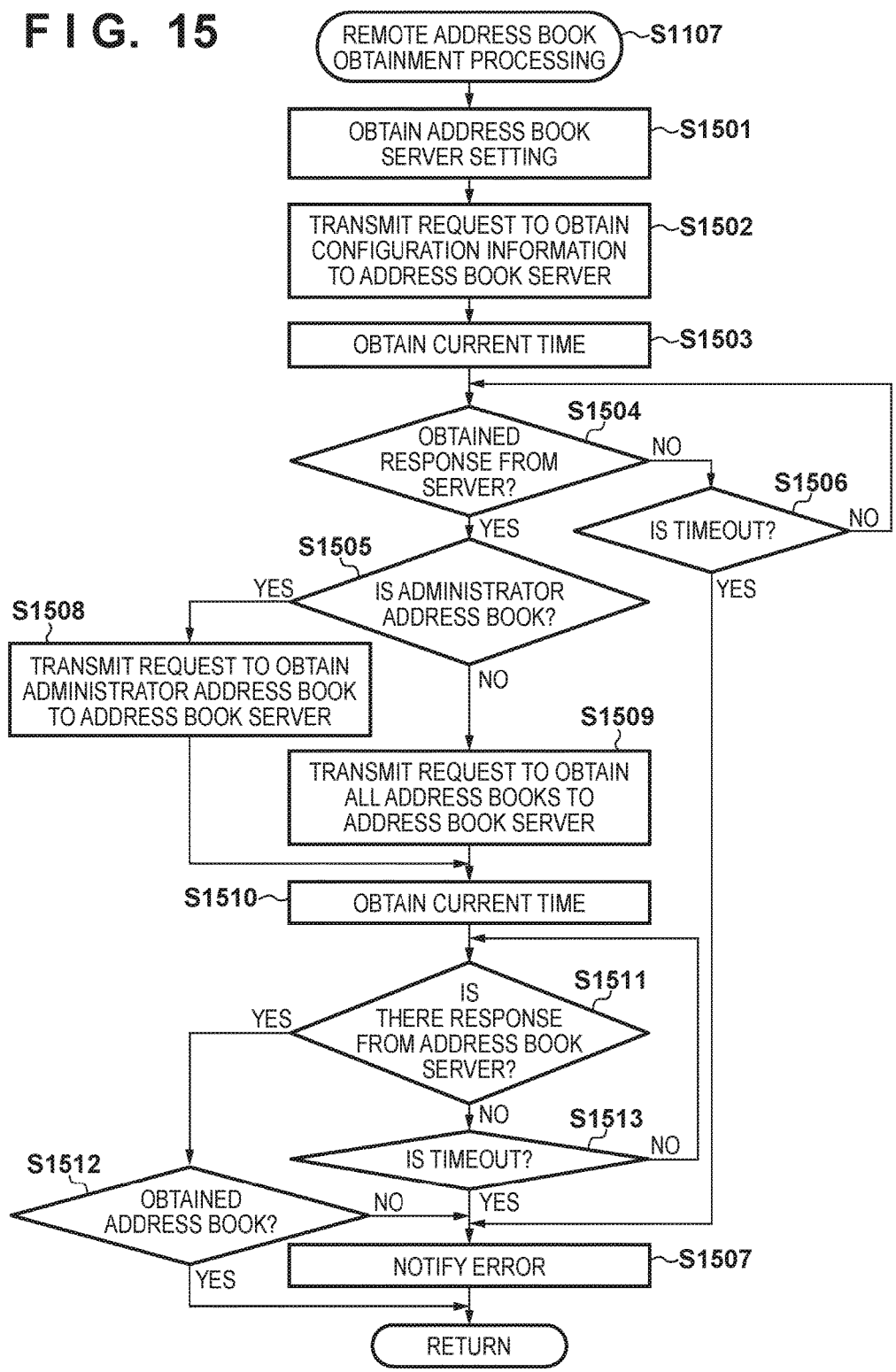

IMAGE COMMUNICATION APPARATUS, METHOD OF CONTROLLING SAME, AND STORAGE MEDIUM FOR DISPLAYING ADDRESSES FROM ADDRESS BOOK

BACKGROUND OF THE INVENTION

Field of the Invention

The present invention relates to an image communication apparatus, a method of controlling the same, and a storage medium.

Description of the Related Art

A device, which registers address book data linked with a user in an address book server and uses an address book that is used by obtaining the address book data linked with the user from the address book server has been proposed (refer to Japanese Patent Laid-Open No. 2008-305176).

Specifically, in a multifunction peripheral (MFP), there is a remote address function that can be used to obtain an address book from another multifunction peripheral (server), and to obtain a destination from that address book.

Conventionally, a multifunction peripheral has equipment that stores an administrator address book, which can only be edited by an administrator. Setting of a transfer destination is often performed by an administrator, and setting of a transfer destination to which the multifunction peripheral transfers received data is preferably a destination registered in the administrator address book. Therefore, it is preferable display the administrator address book as an initial value to accept setting of a transfer destination.

In contrast, among multifunction peripherals there are also devices that do not have such an administrator address book, and if such a device is set as an address obtainment destination server and an address book is requested in order to set a transfer destination, an error would occur. If such an error occurs, there is a fear of causing an administrator to misunderstand that there is no connection to the server, in spite of the fact that there actually is a connection with the server.

The objective of the present invention is to solve the aforementioned problem of the conventional technique.

SUMMARY OF THE INVENTION

The present invention enables realization of making a request to an external apparatus for all address books in a case of displaying an address book that the external apparatus has.

One aspect of the present invention provides an image communication apparatus, comprising: a storage unit configured to store an address book; and a control unit configured to, in a case of displaying the address book stored in the storage unit, control so as to display on a display unit an administrator address book, and, in a case of displaying an address book stored in an external apparatus, control so as to make a request to the external apparatus for all address books that the external apparatus has.

Another aspect of the present invention provides a control method for controlling an image communication apparatus having a storage unit for storing an address book, the method comprising: controlling so as to display in a display unit an administrator address book in a case of displaying an address book stored in the storage unit; and controlling so as to make a request to an external device for all address books that the external apparatus has, in a case of displaying an address book stored in the external apparatus.

Still another aspect of the present invention provides a storage medium storing a program for causing a computer to execute a control method for controlling an image communication apparatus having a storage unit that stores an address book, the method comprising: controlling so as to display in a display unit an administrator address book in a case of displaying an address book stored in the storage unit; and controlling so as to make a request to an external device for all address books that the external apparatus has, in a case of displaying an address book stored in the external apparatus.

Further features of the present invention will be apparent from the following description of exemplary embodiments with reference to the attached drawings.

BRIEF DESCRIPTION OF THE DRAWINGS

The accompanying drawings are included in the specification, configure a portion thereof, illustrate embodiments of the present invention, and are used to explain a principle of the present invention along with the descriptions thereof.

FIG. 14 is a flowchart for describing processing for obtaining a remote address book of step S1107 of FIG. 11 according to the first embodiment.

FIG. 15 is a flowchart for describing processing (step S1107) for obtaining a remote address book by the image communication apparatus according to a second embodiment of the present invention.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
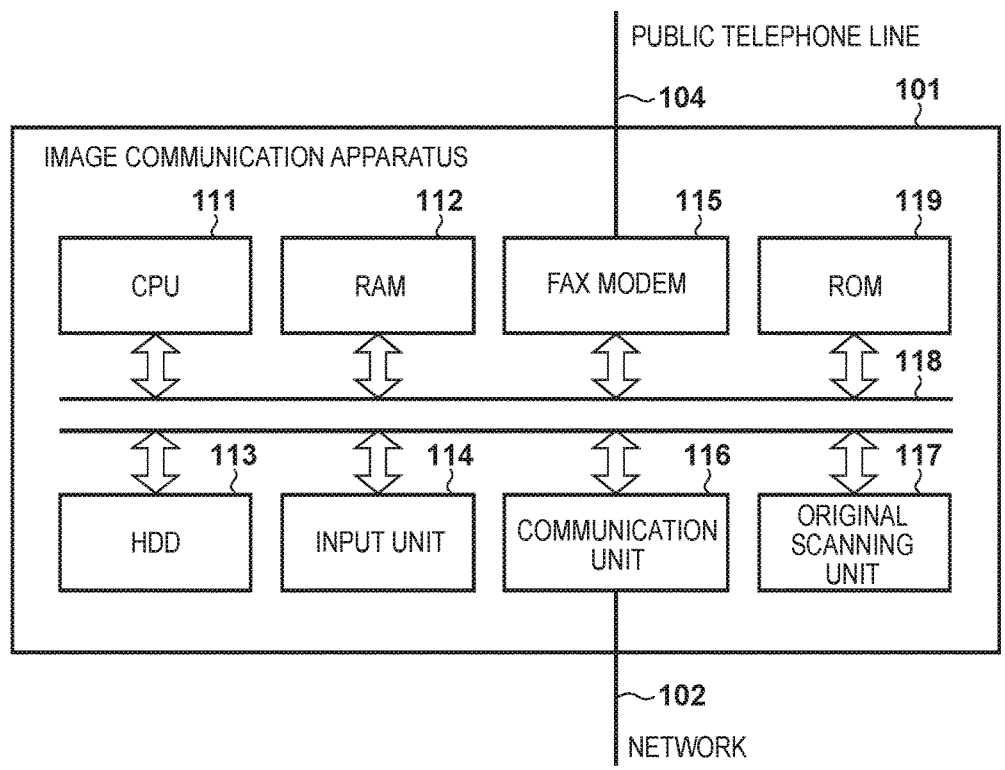
FIG. 1 is a block diagram that explains a hardware configuration of an image communication apparatus according to a first embodiment of the present invention.

FIG. 1 is a block diagram that explains a hardware configuration of an image communication apparatus 101 according to a first embodiment of the present invention.

The image communication apparatus 101 is connected to a network 102 and a public telephone line 104. A CPU 111 controls operation of the image communication apparatus 101 by executing a boot program stored in a ROM 119 to load an OS and programs stored in an HDD 113 into a RAM 112, and executing the loaded programs. The RAM 112 provides a work area used by the CPU 111 as a main memory. The HDD 113 is an example of a storage unit, and is a hard disk drive that stores an OS, programs, various settings, files, and the like. Note that in place of the HDD 113 an NVRAM, an SD memory, or the like may be used as a storage unit. An input unit 114 has a display unit and hard keys, and provides a GUI (graphical user interface) to a user. Note that the display unit has a touch panel function. A FAX modem 115 uses a facsimile protocol to transmit/receive a facsimile signal with an external fax terminal via the public telephone line 104. A communication unit 116 controls communication with external devices via the network 102. An original scanning unit (scanner) 117 scans an original, and generates image data corresponding to an image of the original. The CPU 111 controls operation of each of these units by outputting a control signal, data, or the like to each of these units, which are connected via a bus 118.

Note that the HDD 113 stores address books (local address books), document data that the image communication apparatus 101 received from another fax terminal via the public telephone line 104, a condition for transferring the document data, a combination of destinations to transfer to (transfer setting), and the like. When transmitting, via the network 102 or the public telephone line 104, image data of an original obtained by the original scanning unit 117, a setting (backup transmission setting) for performing a backup transmission of the image data is also stored. Furthermore, a setting for converting a communication history of the image communication apparatus 101 into an electronic file and transmitting it (communication management report setting) is stored, for example. Note that the address books include an administrator address book that only an administrator can edit, and an address book that even a general user other than an administrator can edit.

Figure 2:
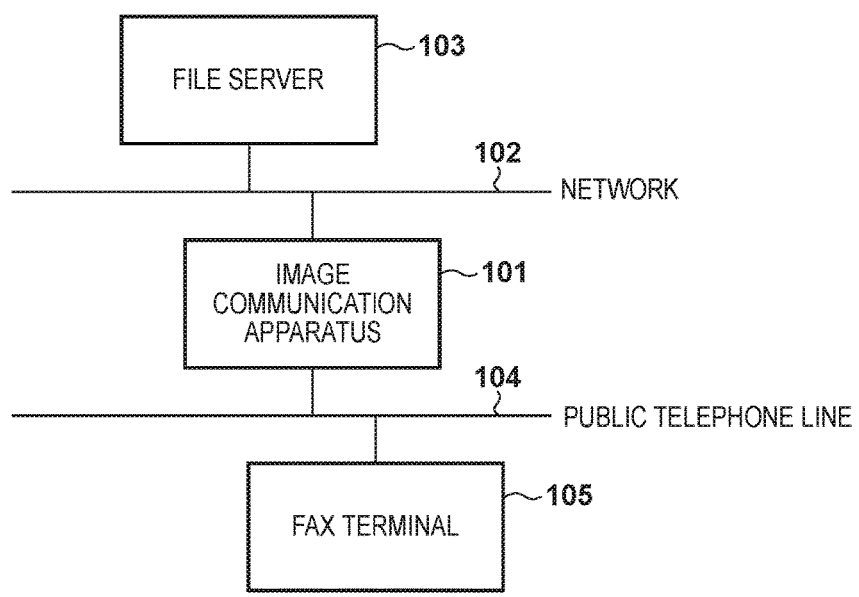
FIG. 2 is a view that illustrates an example of a system configuration that includes the image communication apparatus according to the first embodiment.

FIG. 2 is a view that illustrates an example configuration of a system that includes the image communication apparatus 101 according to the first embodiment.

Here, the image communication apparatus 101 is connected to a file server 103 via the network 102, and to a fax terminal 105 via the public telephone line 104.

Figure 3:
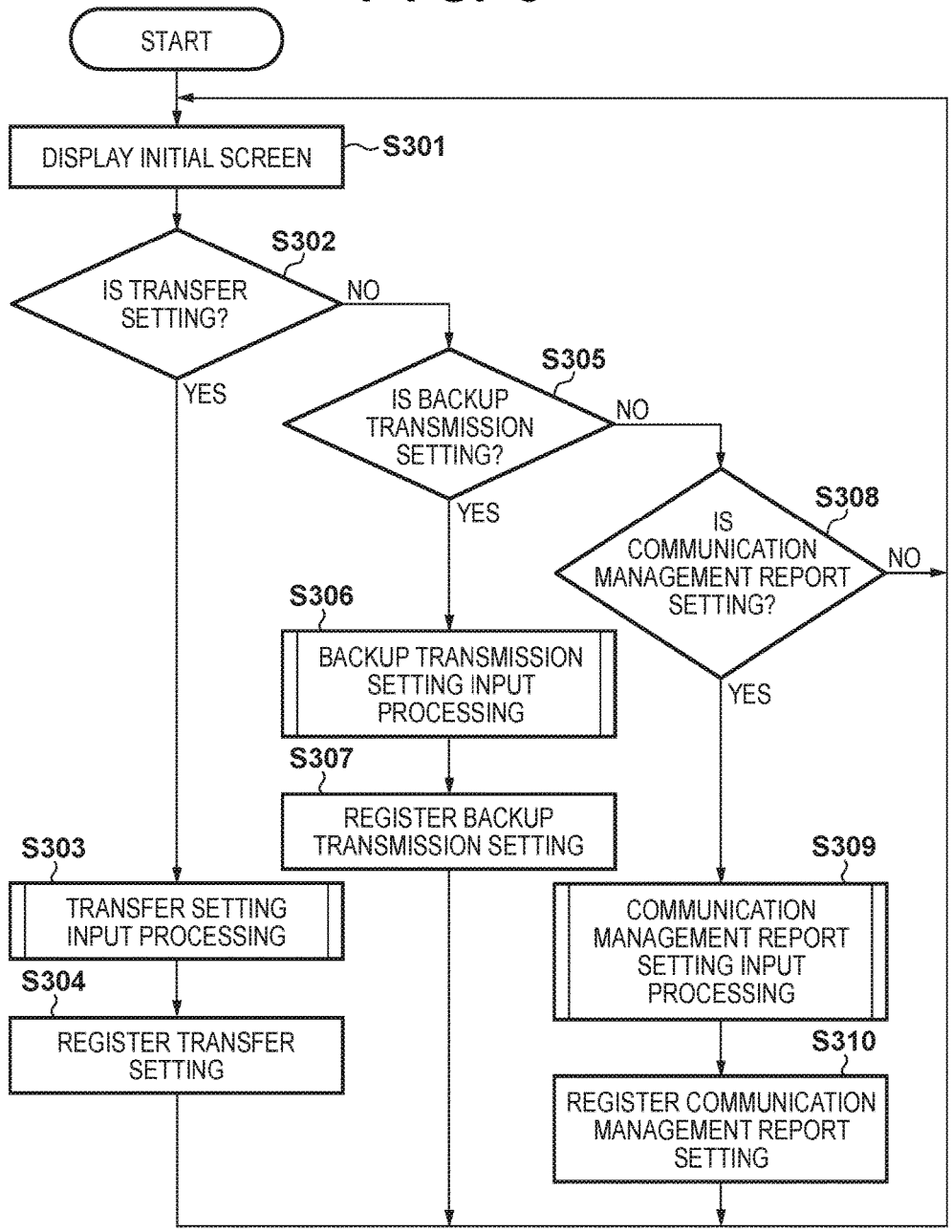
FIG. 3 is a flowchart for describing a transfer setting, a backup transmission setting, and a communication management report setting in the image communication apparatus according to the first embodiment.

FIG. 3 is a flowchart for describing a transfer setting, a backup transmission setting, and a communication management report setting in the image communication apparatus 101 according to the first embodiment. Note that a program for implementing this processing is installed in the HDD 113. Processing illustrated by this flowchart is achieved by the program being loaded into the RAM 112 under the control of the CPU 111, and the CPU 111 executing the program.

Figure 4:
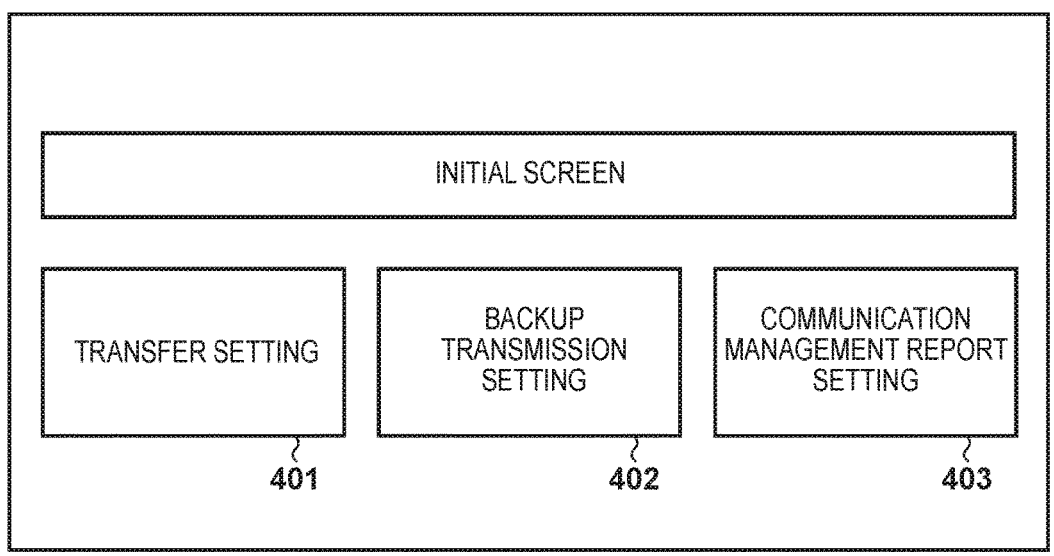
FIG. 4 is a view that illustrates an example of an initial screen displayed by the image communication apparatus according to the first embodiment.

This processing is started when the power source of the image communication apparatus 101 is turned on, for example, and firstly, in step S301, the CPU 111 controls so as to display on the display unit of the input unit 114 an initial screen as illustrated in FIG. 4, for example.

FIG. 4 is a view that illustrates an example of an initial screen displayed by the image communication apparatus 101 according to the first embodiment.

In this initial screen buttons 401-403 for respectively instructing initiation of a transfer setting, a backup transmission setting, and a communication management report setting are displayed.

If a user presses any button via the displayed initial screen in step S301, the processing proceeds to step S302, and the CPU 111 determines whether a transfer setting button 401 has been pressed. Here, when the transfer setting button 401 has been pressed and a transfer setting is instructed, the processing proceeds to step S303, and the CPU 111 executes transfer setting input processing, which is described later with reference to FIG. 5. The processing proceeds to step S304, the CPU 111 stores the transfer setting input by the transfer setting input processing in the HDD 113, and the processing proceeds to step S301.

Meanwhile, if the transfer setting button 401 is not pressed in step S302, the processing proceeds to step S305, and the CPU 111 determines whether a backup transmission setting button 402 has been pressed. When the CPU 111 determines in step S305 that a backup setting of a transmission document has been instructed by pressing of the backup transmission setting button 402, the processing proceeds to step S306, and the CPU 111 executes backup transmission setting input processing, which is described later with reference to FIG. 7. Then the processing proceeds to step S307, the CPU 111 stores the backup transmission setting input by the backup transmission setting input processing in the HDD 113, and the processing proceeds to step S301.

When the CPU 111 determines in step S305 that the backup transmission setting button 402 has not been pressed, the processing proceeds to step S308, and the CPU 111 determines whether a communication management report setting button 403 has been pressed. When the communication management report setting is instructed by the communication management report setting button 403 being pressed, the processing proceeds to step S309, and the CPU 111 executes communication management report setting input processing, which is described later with reference to FIG. 9. Then the processing proceeds to step S310, the CPU 111 stores the communication management report setting inputted by the communication management report setting input processing in the HDD 113, and the processing proceeds to step S301.

By this processing, it is possible to perform these settings on the image communication apparatus 101 by user operations towards buttons 401-403 for respectively instructing initiation of a transfer setting, a backup transmission setting, and a communication management report setting displayed on the initial screen.

Figure 5:
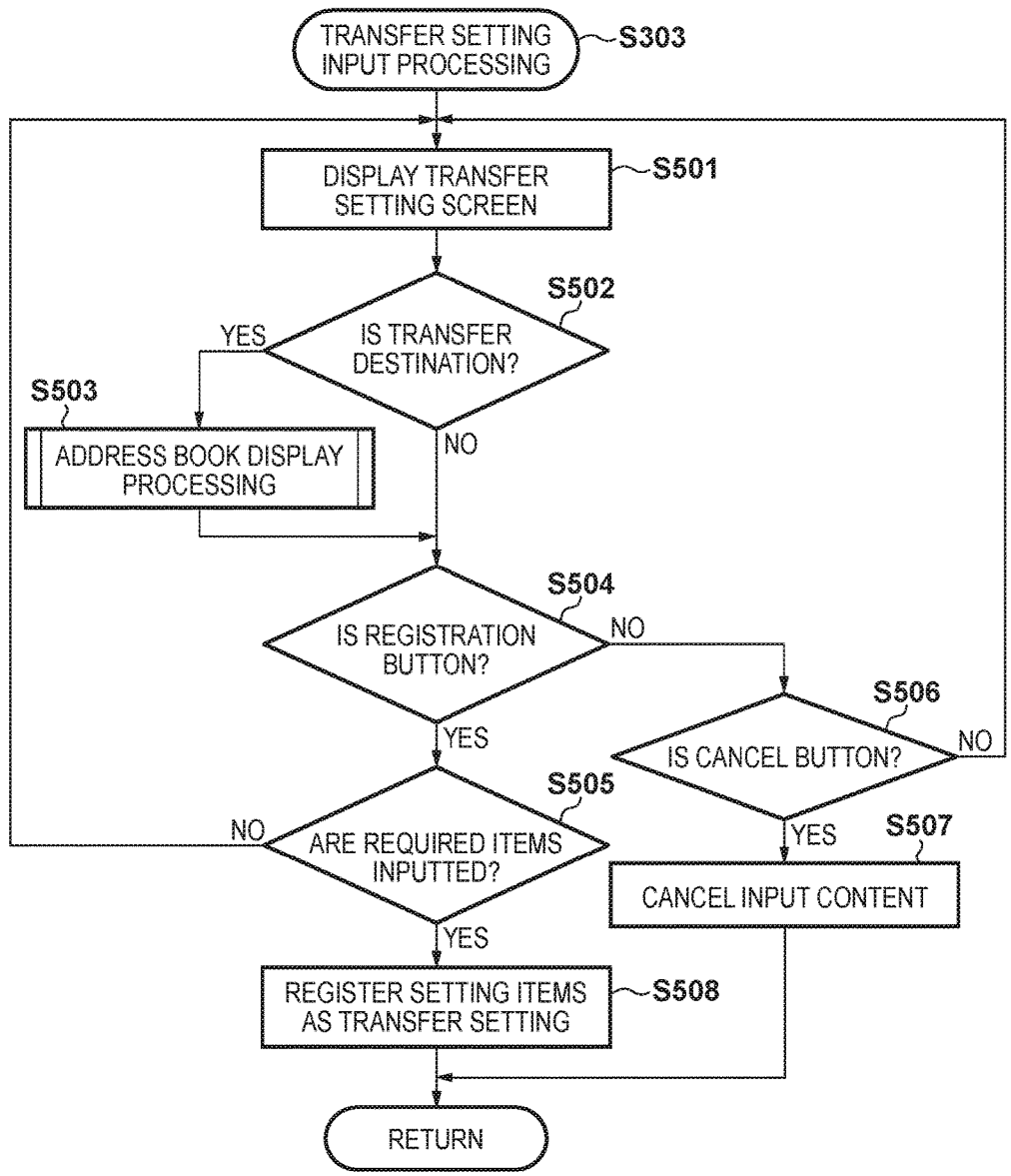
FIG. 5 is a flowchart for describing input processing for a transfer setting of step S303 of FIG. 4 according to the first embodiment.

FIG. 5 is a flowchart for describing input processing for a transfer setting of step S303 of FIG. 4 according to the first embodiment.

Figure 6:
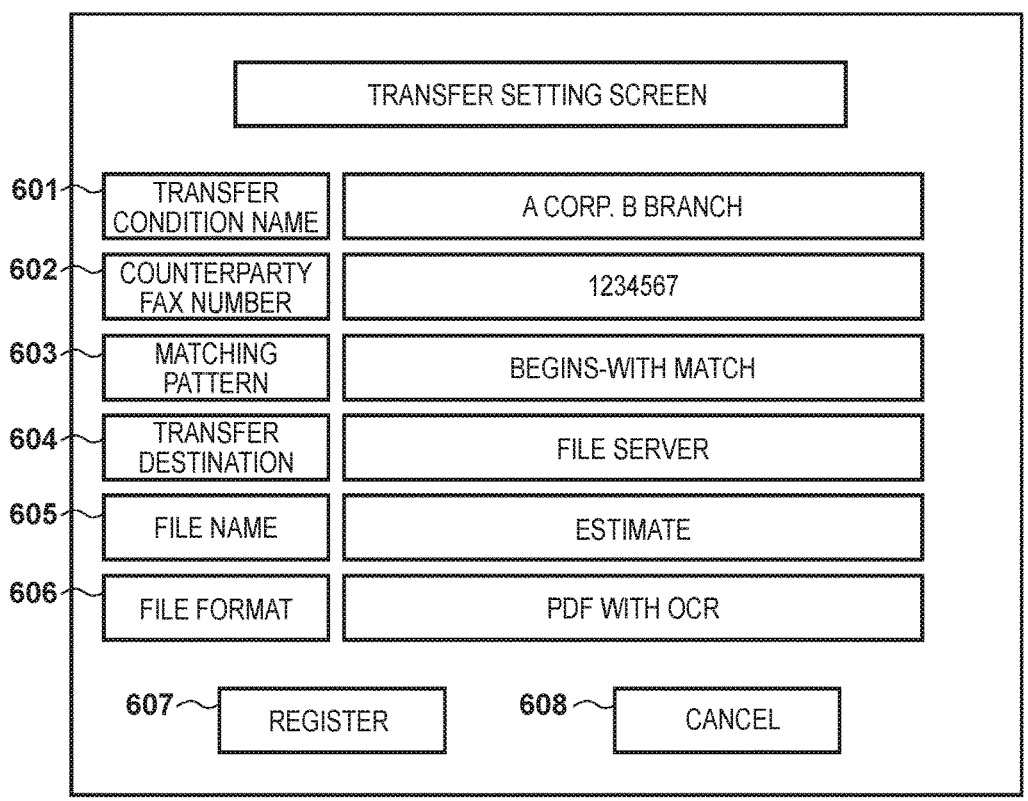
FIG. 6 is a view that illustrates an example of a transfer setting screen displayed by the image communication apparatus according to the first embodiment.

Firstly, in step S501 the CPU 111 displays in the display unit of the input unit 114 a transfer setting screen such as that illustrated in FIG. 6, for example.

FIG. 6 is a view that illustrates an example of a transfer setting screen displayed by the image communication apparatus 101 according to the first embodiment.

The transfer setting screen includes a transfer condition name 601, a counterparty fax number 602, a matching pattern 603, a transfer destination 604, a file name 605, and a file format 606. The matching pattern 603 indicates that the transfer condition is valid when a relationship between the counterparty fax number and the facsimile number of the transmission source has satisfied this condition, and transfer of received data is performed. In FIG. 6 "begins-with match" is registered as a matching pattern. The file name 605 and the file format 606 designate a name of a file to be transferred to the transfer destination, and a file format thereof. In FIG. 6, a file name of "estimate", and a file format of "PDF with OCR" are designated.

A registration button 607 is a button for instructing so as to register content set in this transfer setting screen, and a cancel button 608 is a button for instructing so as to cancel the content set in this transfer setting screen.

Figure 11:
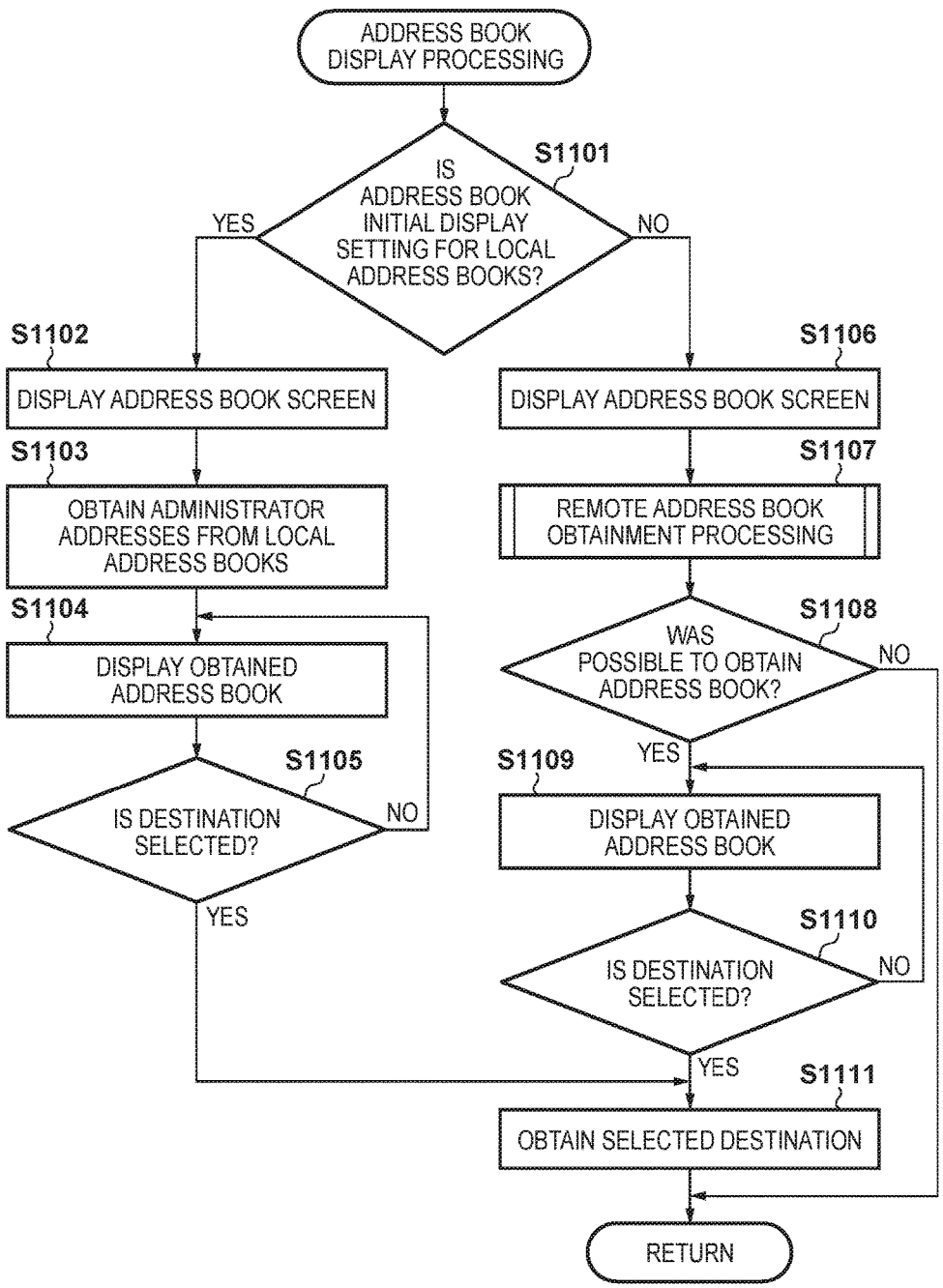
FIG. 11 is a flowchart for describing address book display processing of step S503 of FIG. 5, step S703 of FIG. 7, and step S903 of FIG. 9.

When the CPU 111 detects in step S501 that a user has pressed any button of the transfer setting screen illustrated in FIG. 6, the processing proceeds to step S502, and the CPU 111 determines whether the transfer destination 604 has been selected. When the transfer destination 604 has been selected the processing proceeds to step S503, address book display processing for setting a transfer destination and described later with reference to FIG. 11, is executed, and the processing proceeds to step S504. In addition, when something other than the transfer destination 603 is selected in step S502, the processing proceeds to step S504.

In step S504, the CPU 111 determines whether completion of the transfer setting has been instructed by the registration button 607 being pressed. When it is determined that completion of the transfer setting has been instructed, the processing proceeds to step S505, and it is determined whether input of all items out of items 601 through 606 of FIG. 6 has been performed. If input is complete for all items, the processing proceeds to step S508, and the CPU 111 registers in the HDD 113 the items set via this screen as a transfer setting, and then terminates the processing. Meanwhile, when input of some items has not been performed, the processing proceeds to step S501. In addition, when the registration button 607 is not pressed in step S504 and completion of the transfer setting has not been instructed, the processing proceeds to step S506, and the CPU 111 determines whether the cancel button 608 has been pressed. When the cancel button 608 has been pressed, the processing proceeds to step S507, the CPU 111 deletes setting of all items input via this screen, and terminates processing. In contrast, when the cancel button 608 has not been pressed, the processing returns to step S501.

Figure 7:
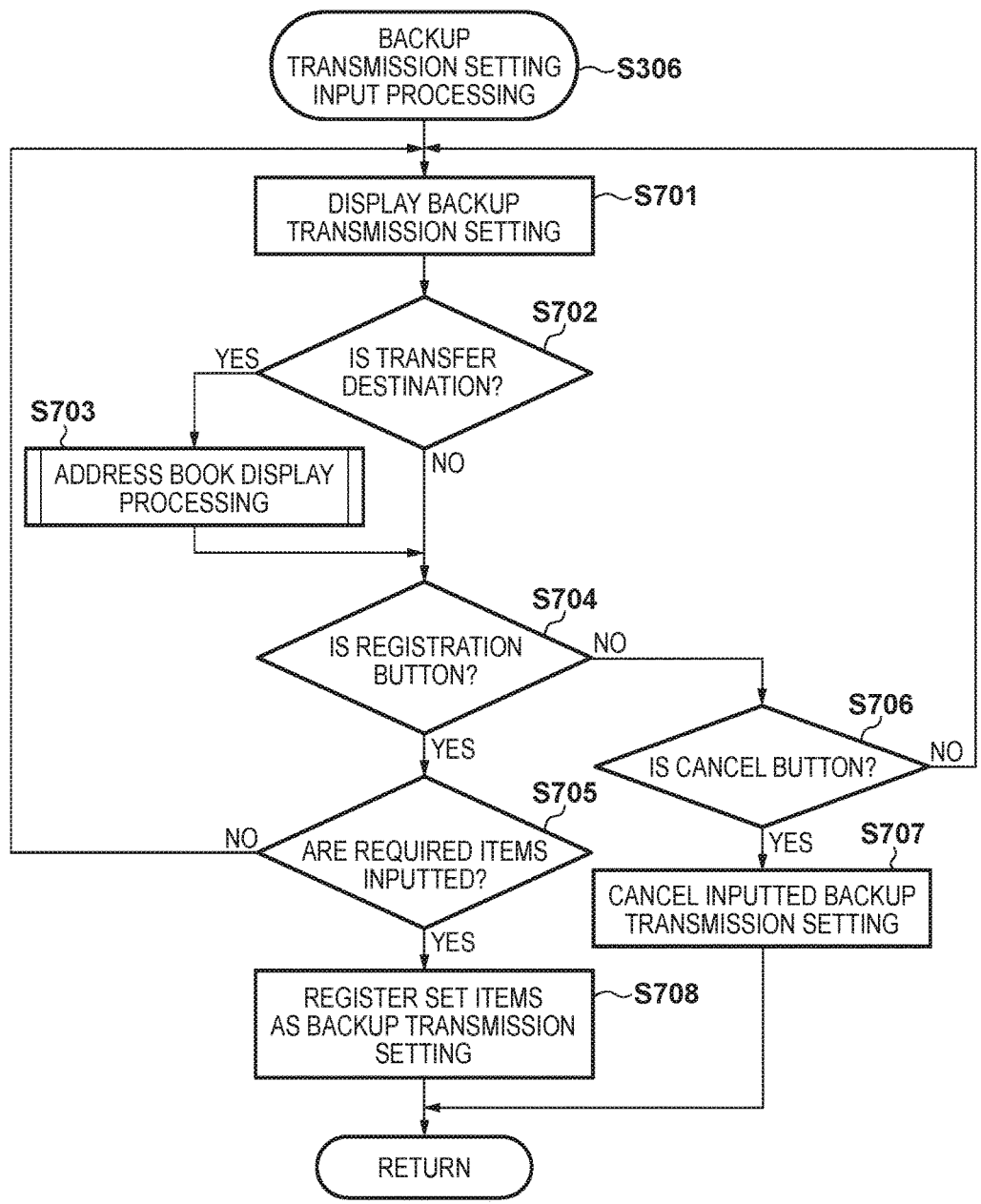
FIG. 7 is a flowchart for describing input processing for a backup transmission setting of step S306 of FIG. 4 according to the first embodiment.

FIG. 7 is a flowchart for describing the input processing for the backup transmission setting of step S306 of FIG. 4 according to the first embodiment.

Figure 8:
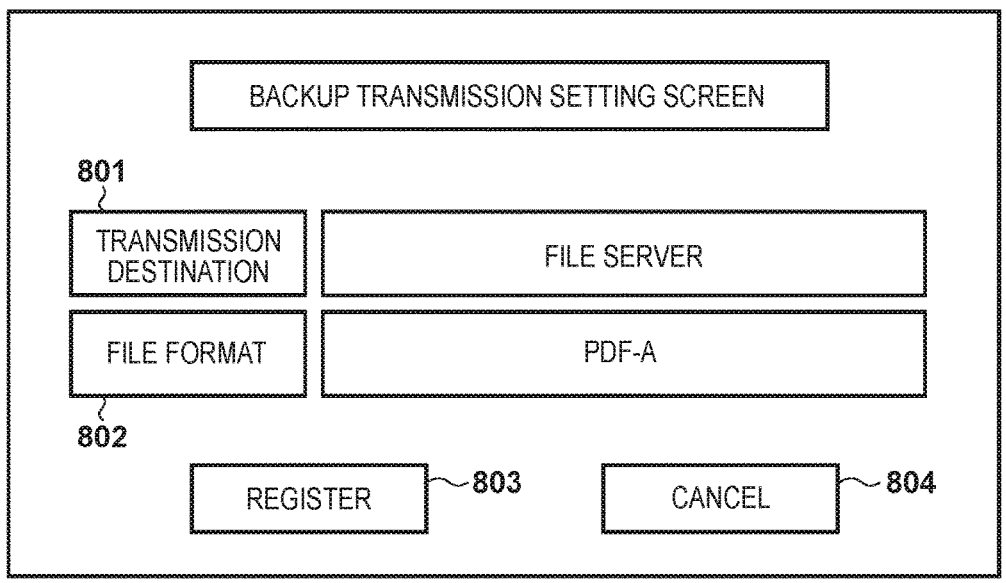
FIG. 8 is a view that illustrates an example of a backup transmission setting screen displayed by the image communication apparatus according to the first embodiment.

Firstly, in step S701 the CPU 111 displays in the display unit of the input unit 114 a backup transmission setting screen such as that illustrated in FIG. 8, for example.

FIG. 8 is a view that illustrates an example of a backup transmission setting screen that is displayed by the image communication apparatus 101 according to the first embodiment.

A transmission destination 801 is for designating the transmission destination of the image data for when backing up the image data of an original scanned by the original scanning unit 107 by transmitting it to a particular destination via the network 102 or the public telephone line 104. The image data of the original scanned by the original scanning unit 107 is transmitted to the destination originally designated as the destination by a user, and is also transmitted to a destination designated for backup. In FIG. 8, "file server" is designated as the transmission destination. A file format 802 designates a file format a time of transmission for the backup. In FIG. 8, "PDF-A" is designated as the file format.

When the CPU 111 detects in step S701 that a user has pressed any button of the backup transmission setting screen, the processing proceeds to step S702, and the CPU 111 determines whether the transmission destination 801 has been pressed. When the transmission destination 801 has been selected the processing proceeds to step S703, address book display processing for setting a transmission destination and described later with reference to FIG. 11, is executed, and the processing proceeds to step S704. In addition, when something other than the transmission destination 801 is selected in step S702, the processing proceeds to step S704.

In step S704, the CPU 111 determines whether completion of the backup transmission setting has been instructed by a registration button 803 being pressed. When it is determined that completion of the backup transmission setting has been instructed, the processing proceeds to step S705, and the CPU 111 determines whether input of all of the items 801 and 802 of FIG. 8 has been performed. If input is complete for all items, the processing proceeds to step S708, and the CPU 111 registers in the HDD 113 the items set via this screen as a backup transmission setting, and then terminates the processing; otherwise, the processing proceeds to step S701. When it is determined that registration button 803 has not been pressed in step S704 and that completion of the backup transmission setting has not been instructed, the processing proceeds to step S706. In step S706, the CPU 111 determines whether a cancel button 804 has been pressed. When the cancel button 804 has been pressed, the processing proceeds to step S707, setting of all items input via the screen are deleted and this processing terminates, but when the cancel button 804 has not been pressed the processing returns to step S701.

Figure 9:
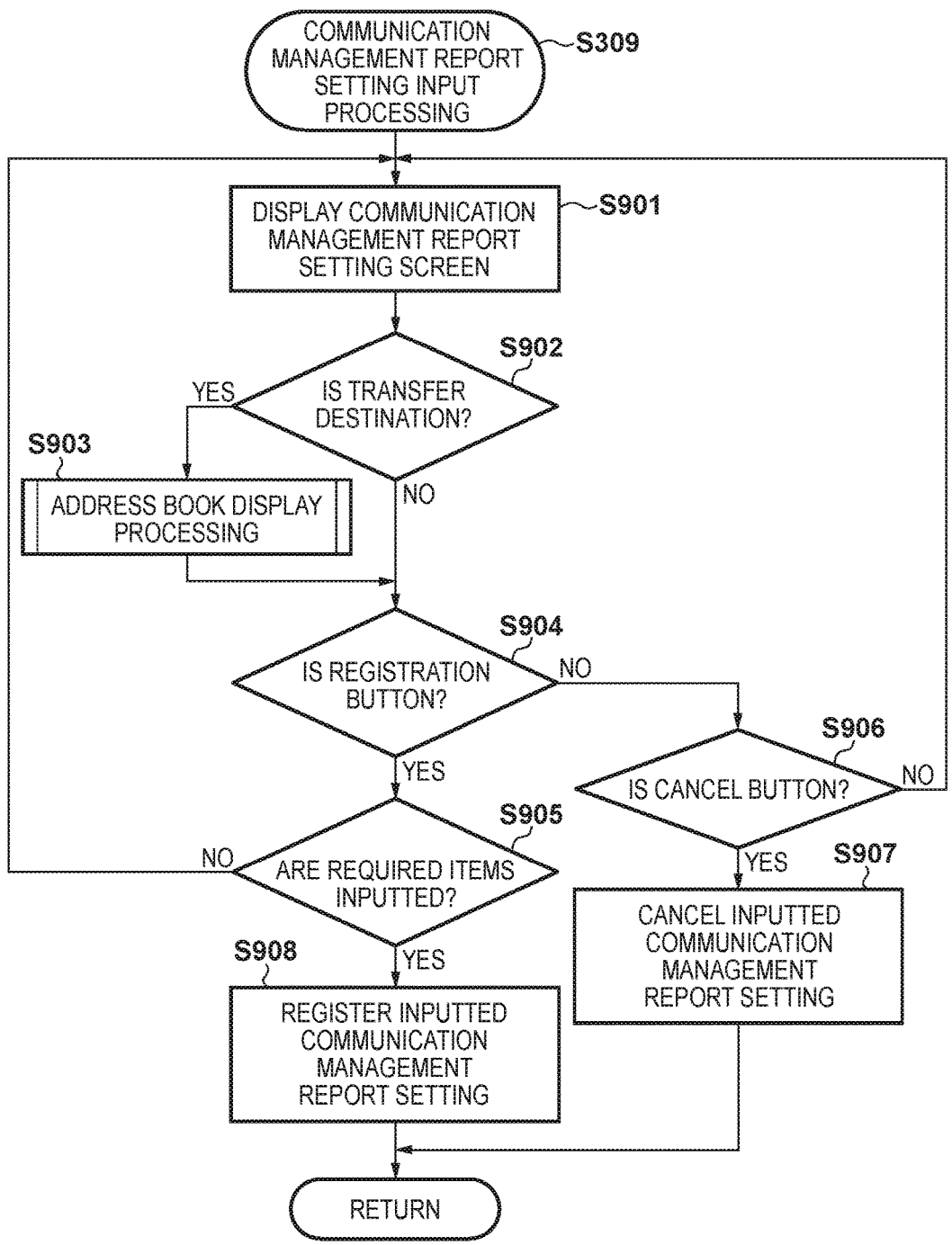
FIG. 9 is a flowchart for describing input processing for a communication management report setting of step S309 of FIG. 4 according to the first embodiment.

FIG. 9 is a flowchart for describing input processing of a communication management report setting of step S309 of FIG. 4 according to the first embodiment.

Figure 10:
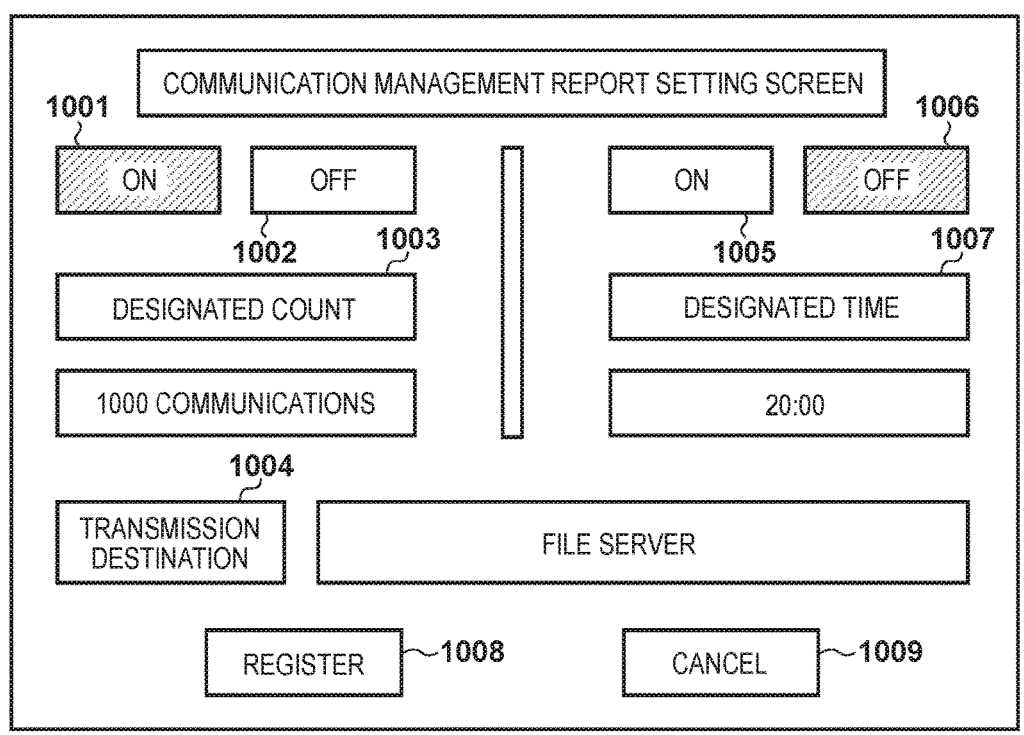
FIG. 10 is a view that illustrates an example of a communication management report setting screen displayed by the image communication apparatus according to the first embodiment.

Firstly, in step S901 the CPU 111 displays in the display unit of the input unit 114 a communication management report setting screen such as that illustrated in FIG. 10, for example.

FIG. 10 is a view that illustrates an example of a communication management report setting screen displayed by the image communication apparatus 101 according to the first embodiment.

An ON button 1001 and an OFF button 1002 are buttons for setting whether to transmit a communication management report, and the ON button 1001 is set so as to transmit, and the OFF button 1002 is set so as to not transmit. When the ON button 1001 is selected, the communication management report is transmitted to the transmission destination designated by a transmission destination 1004 when the number of communication histories of the image communication apparatus 101, which have not been notified to the user exceed a count of a designated count 1003 ("1000" in FIG. 10). In FIG. 10, the ON button 1001 is selected, and the count of the designated count 1003 enabled.

In addition, an ON button 1005 and an OFF button 1006 are buttons for setting whether to transmit the communication management report when a designated time is reached, and the ON button 1005 is set so as to transmit when the designated time is reached, and the OFF button 1006 is set so as to not transmit. Here, if the ON button 1005 is selected, the communication management report is transmitted to the transmission destination designated by the transmission destination 1004 if a time designated by a designated time 1007 ("20:00" in FIG. 10) is reached. In FIG. 10, the OFF button 1006 is selected, and the designated time 1007 setting is disabled.

Note that in any case, the communication management report is transmitted after being converted to an electronic file such as CSV or PDF, for example.

The transmission destination 1004 designates the transmission destination to transmit the communication management report to. In FIG. 10, "file server" is designated as the transmission destination. As the transmission destination 1004, configuration may be taken to designate a host name of the file server, or designate an address of the file server.

When the CPU 111 detects in step S901 that a user has pressed any button of the communication management report setting screen of FIG. 10, the processing proceeds to step S902, and the CPU 111 determines whether the transmission destination 1004 has been pressed. When the transmission destination 1004 is pressed, the processing proceeds to step S903, the CPU 111 executes display processing of the address book to set the transmission destination, and the processing proceeds to step S904. Display processing of the address book is explained later with reference to FIG. 11. In addition, when something other than the transmission destination 1004 is selected in step S902, the processing proceeds to step S904.

In step S904, the CPU 111 determines whether completion of the communication management report setting has been instructed by the registration button 1008 being pressed, and when the registration button 1008 has been pressed the processing proceeds to step S905. In step S905, the CPU 111 determines whether input of all items of FIG. 10 has been performed. If input is complete for all items, the processing proceeds to step S908, and the CPU 111 registers in the HDD 113 the items set via this screen as a communication management report setting, and then terminates the processing; otherwise, the processing proceeds to step S901. In addition, when the registration button 1008 is not pressed in step S904, the processing proceeds to step S906, and the CPU 111 determines whether the cancel button 1009 has been pressed. When the cancel button 1009 has been pressed, setting of all items input via the screen are deleted and this processing terminates, but when the cancel button 1009 has not been pressed the processing returns to step S901.

FIG. 11 is a flowchart for describing the address book display processing of step S503 of FIG. 5, step S703 of FIG. 7, and step S903 of FIG. 9.

Firstly, in step S1101, the CPU 111 obtains an address book initial display setting recorded in the HDD 113, and determines whether it is a setting for addresses to be displayed initially whose address data is obtained from an address book of the HDD 113 (local address book). In a case of displaying destination data obtained from the address book of the HDD 113 (local address book), the processing proceeds to step S1102, and the CPU 111 displays on the display unit of the input unit 114 a local address book screen as illustrated by an example in FIG. 12.

Figure 12:
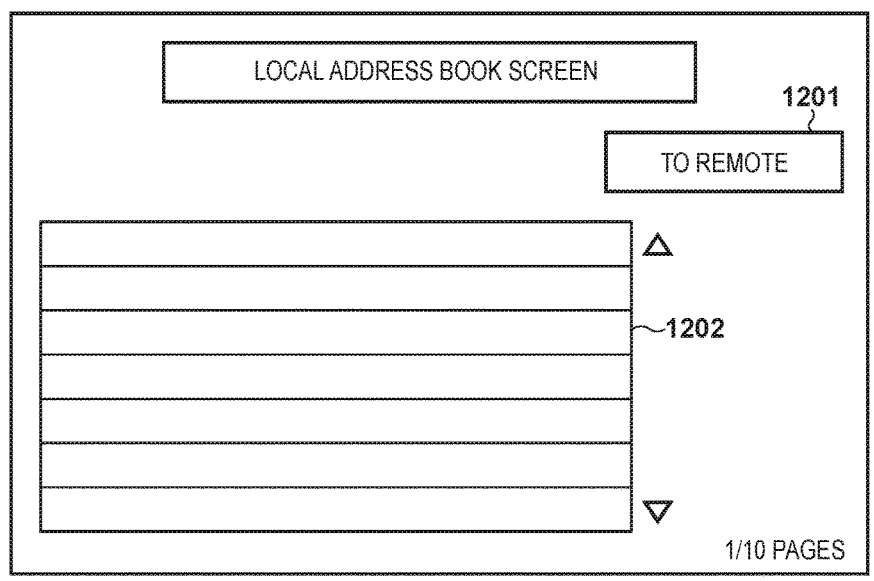
FIG. 12 is the view for showing an example of a screen that displays a local address book.
Figure 13:
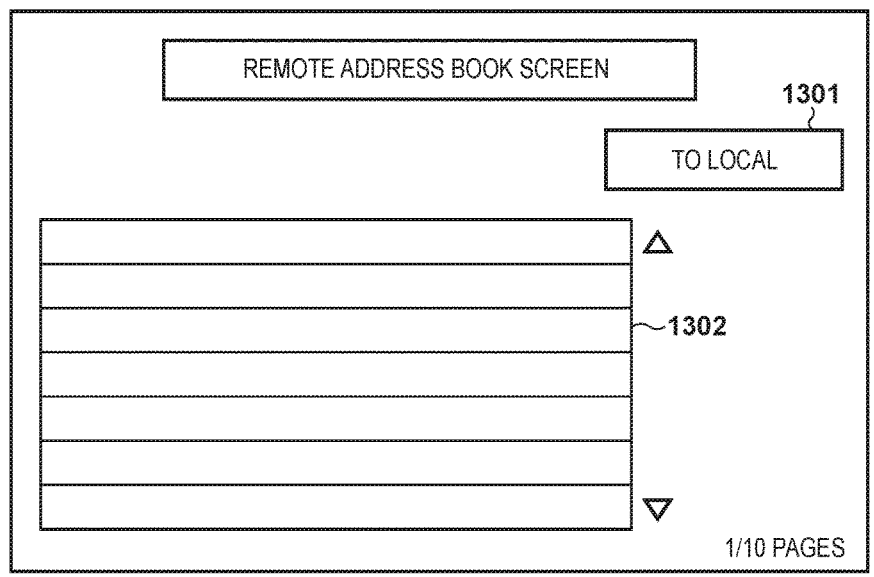
FIG. 13 is the view for showing an example of a screen that displays a remote address book.

FIG. 12 is a screen for displaying the local address book (a list of addresses stored in the local address book). By this screen, when a "to remote" button 1201 is pressed, the destination data displayed is changed to data obtained from remote address books, as illustrated in FIG. 13. Processing in such a case is similar to the processing of step S1106 and onward, which is explained later.

Next, the processing proceeds to step S1103, and the CPU 111 obtains from the HDD 113 an administrator address book which only an administrator can edit. Editing is assumed to be performed via the input unit 114, or from an external PC via the network. Whatever of the ways of editing is performed, if it is determined that a user who is authenticated at a time of usage of the apparatus is a user who holds an administrator authority (is an administrator), the CPU 111 makes the administrator address book editable. However, if it is determined that the authenticated user at the time of use of the apparatus does not have an administrator authority (is a general user), the CPU 111 prohibits editing of the administrator address book. For example, if it is determined that a user authenticated at the time of use of the apparatus does not have an administrator authority, the CPU 111 does not edit the administrator address book even if a request to edit the administrator address book has been received. After the performance of the processing of step S1103, the processing proceeds to step S1104, and the CPU 111 controls so as to display the obtained administrator address book in a list display unit 1202. The administrator address book includes at least one or more administrator addresses that only an administrator can edit, and these are displayed on the list display unit 1202. The processing proceeds to step S1105, and the CPU 111 determines whether at least one or more of the destinations of the administrator address book displayed on the list display unit 1202 in step S1104 has been selected. If one is determined to be selected, the processing proceeds to step S1111, the selected destinations are obtained, and this processing terminates. However, if not even one destination has been selected, the processing returns to step S1104.

Meanwhile, if the CPU 111 determines in step S1101 that it is set to not an address obtained from an address book of the HDD 113 (remote address setting), the processing proceeds to step S1106. Then, in step S1106, the CPU 111 controls to display in the display unit of the input unit 114 an address book screen such as that illustrated in FIG. 13, for example.

FIG. 13 is a screen for displaying a remote address book (a list of addresses stored in a remote address book). In this screen, if a "to local" button 1301 is pressed, it is possible to switch a display target from the remote address book to the local address book, and switch to display of an address list obtained from the local address book. Processing in such a case is the same as the previously described processing of step S1102 and onward.

Next, the processing proceeds to step S1107, and the CPU 111 executes processing for obtaining the remote address book. Next, the processing proceeds to step S1108, and the CPU 111 determines whether it was possible to successfully obtain an address book by the processing for obtaining the remote address book of step S1107. Here, if it is determined that it was possible to obtain the address book successfully, the processing proceeds to step S1109, the CPU 111 reads a list of obtained address books from the RAM 112, and after reflecting the address book screen displayed in step S1106 the processing proceeds to step S1110. In step S1110, the CPU 111 determines from the address book display screen whether at least one destination has been selected, and if at least one destination has been selected, the processing proceeds to step S1111. In step S1111, the CPU 111 obtains the selected destinations and then terminates the processing; if there is no selection, the processing returns to step S1109. Meanwhile, if it is determined in step S1108 that it was not possible to obtain the address book from the remote address book, the processing illustrated on the flowchart of FIG. 11 terminates.

FIG. 14 is a flowchart for describing the remote address book obtainment processing of step S1107 of FIG. 11, according to the first embodiment.

Firstly, in step S1401, the CPU 111 obtains information of an external device (an address book server) from which to obtain the destination data. Next, the processing proceeds to step S1402, and the CPU 111 transmits a request to obtain all address books to the external device (server) indicated by the obtained information, via the network 102. All address books includes not only an administrator address book that only an administrator can edit, but also a general address book that even a general user other than an administrator can edit. The general address book includes at least one or more address that can be edited by an administrator and a general user, and in step S1109 these are displayed in a list display unit 1302. In step S1402, a request to obtain all of these address books is transmitted. Note that the general address book can be edited by the CPU 111, regardless of whether a user authenticated at the time of use of the apparatus has or does not have an administrator authority. Here, any protocol may be used when transmitting the request to obtain to the external device, and the scope of the present invention is not limited. Next, the processing proceeds to step S1403, and the CPU 111 obtains the current time set in the image communication apparatus 101. Next, the processing proceeds to step S1404, and the CPU 111 determines whether there is a response from the external device (server) to which the request to obtain the destination data was transmitted, and if there is a response the processing proceeds to step S1405, and it is determined from the response whether it was possible to obtain a normal address book. When it is determined that it was possible to obtain a normal address book, the processing proceeds to step S1406, the obtained address book is temporarily stored in the RAM 112, and this processing terminates. However, if it is determined in step S1405 that obtainment was not possible, the processing proceeds to step S1408, and the CPU 111 displays a screen notifying to the effect that an error has occurred on the display unit of the input unit 114, and this processing terminates.

In addition, if the CPU 111 determines in step S1404 that there is no response, the processing proceeds to step S1407, and determines whether a timeout has occurred based on an amount of time from the time obtained in step S1403 until the current time. However, if it is determined that a timeout occurred, the processing proceeds to step S1408, and the CPU 111 displays a screen notifying to the effect that an error has occurred on the input unit 114, and this processing terminates. If the CPU 111 determines in step S1407 that a timeout has not occurred, the processing returns to step S1404.

As explained above, by the first embodiment, if a local address book is obtained, an administrator address book that only an administrator can edit is obtained and displayed. Meanwhile, in the case of obtaining an address book from an external device (an address book server), all address books and not just the administrator address book are requested from the external device. In this way, even with address books displayed for the same purpose, the address books that are requested to be obtained change depending on whether a screen displayed is for local or remote. Because of this, even if the external device does not have an administrator address book, because it is possible to receive some kind of response from the external device, it is possible to prevent the occurrence of an error such as misrecognition that there is no connection to the external device.

Second Embodiment

Next, explanation will be given for a second embodiment of the present invention. In the second embodiment, explanation is given of example that changes the processing to obtain remote address books from the case of the first embodiment.

FIG. 15 is a flowchart for describing processing (step S1107) for obtaining remote address books by the image communication apparatus 101 according to a second embodiment of the present invention. This processing is a variation processing of the previously described step S1107 of FIG. 11. Note that because a system configuration, and a configuration or the like of the image communication apparatus 101 according to the second embodiment are the same as those of the previously described first embodiment, explanation thereof is omitted.

Firstly, in step S1501, the CPU 111 obtains information of an external device (an address book server) from the HDD 113. Next, the processing proceeds to step S1502, and the CPU 111 transmits a request to obtain address book configuration information to the external device. After the transmission of this request to obtain, the processing proceeds to step S1503, and the CPU 111 obtains the current time set in the image communication apparatus 101. In this way, upon obtaining the current time, the processing proceeds to step S1504, and the CPU 111 determines whether there is a response from the external device. Here, upon determining that there is a response, the processing proceeds to step S1505; otherwise, the processing proceeds to step S1506, and the CPU 111 determines whether a timeout has occurred based on the time obtained in step S1503 and the current time. If it is determined that a timeout has occurred, the processing proceeds to step S1507, and the CPU 111 displays on the display unit of the input unit 114 a screen that notifies to the effect that an error has occurred, and this processing terminates.

Meanwhile, when it is determined in step S1504 that there is a response, the processing proceeds to step S1505, and the CPU 111 analyzes the response, and determines whether the response from the external device indicates that there is an administrator address book that only an administrator can edit. Here, if it is determined that the external device has an administrator address book, the processing proceeds to step S1508, a request to obtain the address book that only an administrator can edit is transmitted to the external device, and the processing proceeds to step S1510. Meanwhile, if it is determined in step S1505 that the external device does not have an address book that only an administrator can edit, the processing proceeds to step S1509, a request to obtain all address books is transmitted to the external device, and the processing proceeds to step S1510.

In step S1510, the CPU 111 obtains the current time. Next, the processing proceeds to step S1511, and the CPU 111 determines whether a response from the external device has come. Here, if it is determined that there is a response, the processing proceeds to step S1512, the CPU 111 determines whether an address book can be obtained from the response, and if obtaining is possible the obtained address books are temporarily stored in the RAM 112, and this processing terminates. Meanwhile, if an address book could not be obtained, the processing proceeds to step S1507, a screen notifying an error is displayed on the display unit of the input unit 114, and this processing terminates. If there is no response in step S1511, the processing proceeds to step S1513, and the CPU 111 determines whether a timeout has occurred based on the time obtained in step S1503, and the current time. Here, if it is determined that a timeout has occurred, the processing proceeds to step S1507, and if it is determined that one has not occurred, the processing returns to step S1511.

As explained above, by the second embodiment, an external device is queried in advance for configuration information of address books that the external device has. After confirming that the external device has an administrator address book, a request is made to the external device for the administrator address book. By this, even if the external device does not have an administrator address book, because it is possible to receive some kind of response from the external device, it is possible to prevent the occurrence of an error such as misrecognition that there is no connection to the external device.

OTHER EMBODIMENTS

Note that, in the above described embodiment, an administrator address book was explained as an address book that only an administrator can edit, and a general address book other than that was explained as an address book that even a general user other than an administrator can edit. However, the present invention is not limited to this. For example, configuration may be taken such that an administrator address book is an address book that only an administrator can refer to, and a general address book other than that is an address book that even a general user other than an administrator can refer to. Referring is assumed to be performed via the input unit 114, or from an external PC via the network. Whatever of the ways of referring is performed, if it is determined that a user who is authenticated at a time of usage of the apparatus is a user who holds an administrator authority, the CPU 111 makes the administrator address book possible to reference. However, if it is determined that the authenticated user at the time of use of the apparatus does not have an administrator authority, the CPU 111 prohibits referencing of the administrator address book. For example, if it is determined that a user authenticated at the time of use of the apparatus does not have an administrator authority, the CPU 111 does not display the administrator address book even if a request to display the administrator address book has been received. Also the general address book can be referenced by the CPU 111, regardless of whether a user authenticated at the time of use of the apparatus has or does not have an administrator authority.

By virtue of the present invention, there is the effect that a misunderstanding that there is no connection to the external device ceases to be caused regardless of whether an external device, which manages address books for which a display request has been received, has an administrator address book.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-136370 filed on Jul. 7, 2015, which is hereby incorporated by reference herein in its entirety.

What is claimed is:

1. A data processing apparatus which is able to communicate with an external apparatus, comprising:
    a storage configured to store a first address book for an administrator and a second address book for a user other than the administrator;
    a display configured to display at least one address included in an address book; and
    a controller configured to set a transfer destination of received data from the at least one address displayed by the display,
    wherein the received data is transferred to the set transfer destination;
    wherein the display initially displays, in a case where the display displays at least one address included in an address book stored in the storage in accordance with a display request of the transfer destination, at least one address included in the first address book without initially displaying an address included in the second address book, and
    wherein the display initially displays, in a case where the display displays at least one address included in an address book stored in the external apparatus in accordance with a display request of the transfer destination, at least one address in all address books that the external apparatus has.

2. The data processing apparatus according to claim 1, wherein
    the controller requests all address books for the external apparatus, and
    wherein the display initially displays the at least one address included in the all address books transmitted from the external apparatus as a response to the request.

3. The data processing apparatus according to claim 1, wherein the controller sets the transfer destination from the at least one address included in the first address book displayed by the display or the at least one address included in all address books displayed by the display.

4. The data processing apparatus according to claim 1, wherein the controller confirms, based on configuration information of the external apparatus, whether or not the external apparatus has an address book for an administrator, wherein, if it is confirmed that the external apparatus has the address book for the administrator in a case where the display displays at least one address included in the address book in the external apparatus, the display initially displays the address book that the external apparatus has.

5. A control method for controlling a data processing apparatus which is able to communicate with an external apparatus, the method comprising:

storing, in a storage, a first an address book for an administrator and a second address book for a user other than the administrator;

displaying at least one address included in an address book;

setting a transfer destination of received data from the at least one displayed address; and transferring the received data to the set transfer destination, wherein in a case where at least one address included in an address book stored in the storage is displayed in accordance with a display request of the transfer destination, at least one address included in the first address book stored in the storage is initially displayed without initially displaying an address included in the second address book, and wherein, in a case where at least one address included in an address book stored in the external apparatus is displayed in accordance with a display request of the transfer destination, at least one address in all address books that the external apparatus has is initially displayed.

6. A non-transitory computer readable storage medium storing a program for causing a computer to execute a control method for controlling a data processing apparatus which is able to communicate with an external apparatus, the method comprising:

storing, in a storage, a first address book for an administrator and a second address book for a user other than the administrator;

displaying at least one address included in an address book;

setting a transfer destination of received data from the at least one displayed address; and transferring the received data to the set transfer destination, wherein, in a case where at least one address included in an address book stored in the storage is displayed in accordance with a display request of the transfer destination, at least one address included in the first address book stored in the storage is initially displayed without initially displaying an address in the second address book, and wherein in a case where at least one address included in an address book stored in the external apparatus is displayed in accordance with a display request of the transfer destination, at least one address included in all address books that the external apparatus has is initially displayed.

* * * * *